United States Patent [19]

Charon

[11] 4,440,398
[45] Apr. 3, 1984

[54] CARD GAME AND METHOD OF PLAYING SAME

[75] Inventor: Alfred G. Charon, Cloquet, Minn.

[73] Assignee: Cha-Du-Ke, Cloquet, Minn.

[21] Appl. No.: 381,039

[22] Filed: May 24, 1982

[51] Int. Cl.³ .............................................. A63F 1/00
[52] U.S. Cl. ................................................. 273/292
[58] Field of Search ............... 273/292, 303, 304, 305, 273/306

[56] References Cited

U.S. PATENT DOCUMENTS

| | | | |
|---|---|---|---|
| D. 141,317 | 5/1945 | Smith, Sr. | |
| 422,807 | 3/1890 | Koehler | |
| 755,243 | 3/1904 | Reed | |
| 812,676 | 2/1906 | Paul | |
| 821,229 | 5/1906 | Fortier | |
| 1,100,869 | 6/1914 | Fisher | |
| 1,357,166 | 10/1920 | Hart | 273/303 |
| 1,458,849 | 6/1923 | Prime | |
| 3,042,408 | 7/1962 | Johnson | |
| 4,009,884 | 3/1977 | Weigl | |
| 4,199,146 | 4/1980 | Dato | |
| 4,243,226 | 1/1981 | Kendall | |

OTHER PUBLICATIONS

"Scarne's Encyclopedia of Games" by John Scarne, published by Harper & Row, N.Y., copyright 1973, pp. 278-282.

Primary Examiner—Anton O. Oechsle
Attorney, Agent, or Firm—Merchant, Gould, Smith, Edell, Welter & Schmidt

[57] ABSTRACT

A card game apparatus comprising a collection of 52 cards which in turn are comprised of six distinct groups is disclosed. Every card of a group bears upon its face indicia distinctive of the cards of that group. One of the groups of cards includes twelve cards while the other five groups of cards include eight cards each for a total of 52 cards. The five eight card groups have indicia such that the five groups may be sequentially ordered, either by numbering or some other sequential coding format. Also disclosed is a method of playing the card game with at least two players and a deck of 52 cards as described above, wherein at least one of the players is designated as a dealer for dealing the cards. Each player is dealt two cards with a third card being dealt to each player having a hand which qualifies for continuing play according to a predetermined qualifying standard. Each player's cards are scored according to a predetermined priority sequence.

9 Claims, 1 Drawing Figure

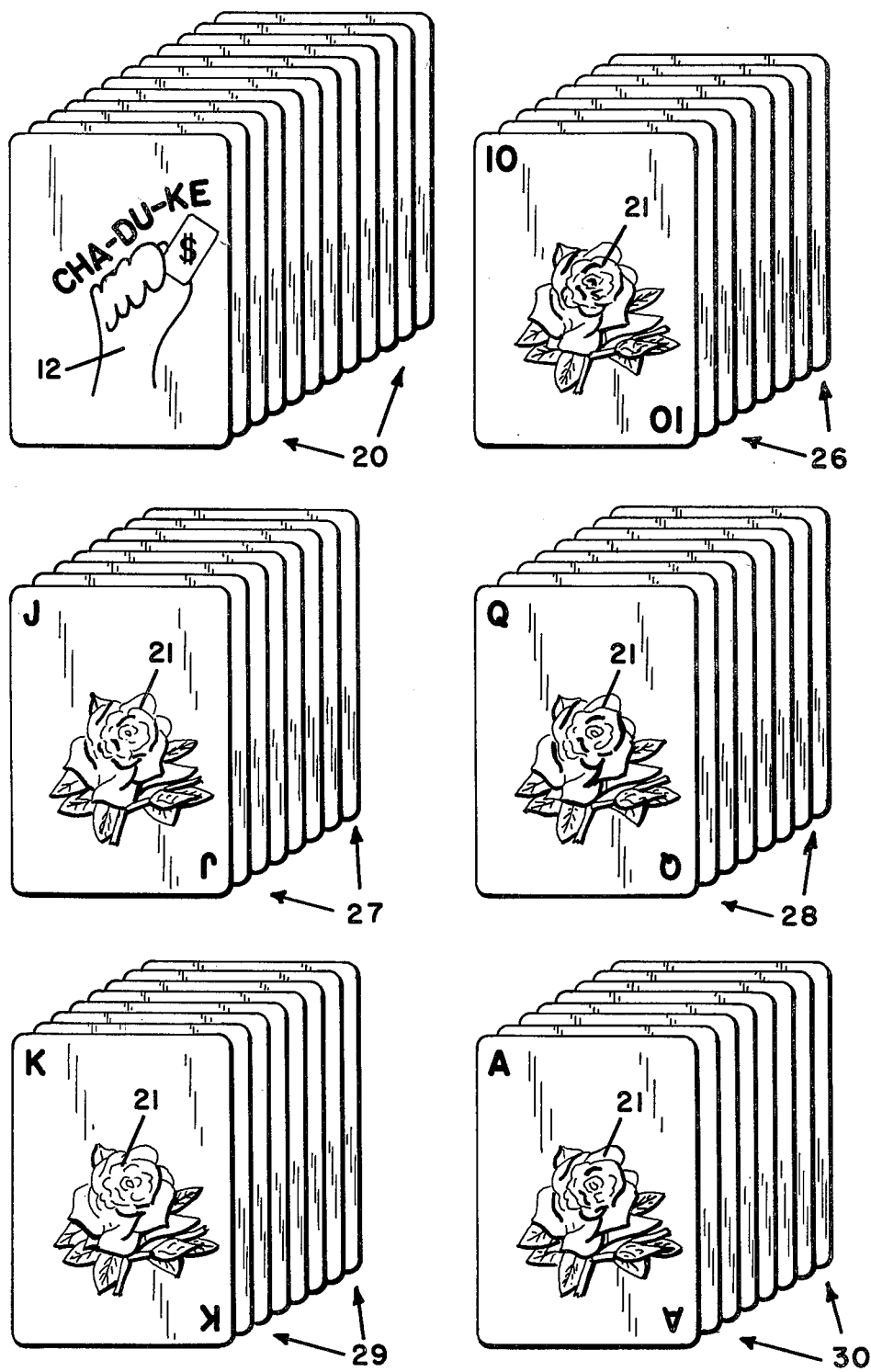

CARD GAME AND METHOD OF PLAYING SAME

BACKGROUND OF INVENTION

The present invention relates to a card game apparatus and method for playing a card game. More particularly, the present invention relates to a card game for amusement and entertainment and method for playing the same wherein a dealer deals a predetermined number of cards to individual player's, each players' card hand then being ranked or scored according to a predetermined priority sequence.

SUMMARY OF THE INVENTION

The present invention relates to a card game apparatus comprising a collection of fifty-two cards which in turn are comprised of six distinct groups. Every card of a group bears upon its face indicia distinctive of the cards of that group. One of the groups of cards includes twelve cards while the other five groups of cards include eight cards each for a total of fifty-two cards. The eight-carded groups have indicia such that the five groups may be sequentially ordered, either by numbering or some other sequential coding format.

The present invention also relates to a method of playing a card game with at least two players and a deck of fifty-two cards as described above, wherein at least one of the players is designated as a dealer for dealing the cards. In the method, the dealer deals two cards face up to each player, and one card face up and one face down to himself. If no player receives two cards of the above-mentioned first group having twelve cards, then a third card is dealt to each player having a hand which qualifies for continuing play according to a predetermined qualifying standard. If the dealer has two cards of the first group then no player receives a third card. If a player other than the dealer has two cards of the first group and the dealer does not, then the dealer deals a third card to all players not having two cards of the first group. After having dealt two or three cards following this method, each player's cards are scored according to a predetermined priority sequence. An advantageous feature of the present invention is that it can be played by a varying number of players. Furthermore, the present invention may be comprised of multiple decks of 52 cards.

Yet another feature of the present invention is the use of all twelve cards in the twelve card member group as wild cards which can be utilized with any of the other cards to form a scoring combination.

Additionally, the present invention provides for much entertainment and enjoyment with only a few cards being dealt to each player such that the pace of the card game is relatively quick and fast moving.

A further advantage of the present invention is that a player is not required to keep a numeric count of differing card values and combinations thereof. A player need only keep in mind, while playing, the winning combinations which are possible, i.e. two wild cards, three-of-a-kind or a straight.

Yet another feature of the present invention, is that with any given hand, there may be no player with a scoring or winning hand or there may be any combination of players who have a winning hand.

Additionally, the game rules are relatively easy to learn such that a first time player can readily adapt to the game and become proficient in a very short period of time. Therefore, beginner players can derive enjoyment and much satisfaction from the game after a few hands of play.

Furthermore, one person may serve as a designated dealer or the players may take turns being the dealer according to a predetermined sequence, e.g. after all the cards have been dealt out, after each hand, after a predetermined number of hands, etc.

These and various other advantages and features of novelty which characterize the invention are pointed out with particularity in the claims annexed hereto and forming a part hereof. However, for a better understanding of the invention, its advantages, and objects obtained by its use, reference should be had to the drawing which forms a further part hereof, and to the accompanying descriptive matter, in which there is illustrated and described a preferred embodiment of the invention.

BRIEF DESCRIPTION OF THE DRAWINGS

In the drawing, in which like reference numeral and letters indicate corresponding parts throughout the view, FIG. 1 is an elevational view of one embodiment of a set of cards utilized in the card game of the present invention.

DETAILED DESCRIPTION OF THE INVENTION

Illustrated in FIG. 1 is a deck or set of rectangularly shaped cards embodying the principles of the present invention. The embodiment shown includes one group or suit 20 of twelve cards bearing the same indicia. Each card has on the face thereof a human clenched hand 22 holding a rectangular object 24 with a dollar sign thereon so as to be indicative of paper money or currency. In addition, the expression "CHA-DU-KE" is positioned just over the clenched hand. Each card of the group is thus, on its face, a facsimile of the other cards in the group. However, cards of group 20 are distinguishable from the cards of the other groups.

In addition to group 20 which has twelve cards, there are five other groups, 26-30, having eight cards each. In the embodiment shown, on the face of each card approximately in the center thereof, there is a representation of a rose 21. In addition, the cards of each individual group have identical markings in diagonal corners which distinguish the cards of that particular group from the cards of each of the other groups. In the embodiment shown, the cards of group 26 have a "10", group 27 cards have a "J", group 28 cards have a "Q", group 29 cards have a "K", and group 30 cards have an "A" in their respective diagonal corners. The markings of the eight-carded groups are sequentially ordered according to a sequential coding format. In the embodiment shown, the ordered format is "A-K-Q-J-10". The particular indicia used are not critical, but the existence of an understandable defined ordering characterizing the groups 26-30 is important to the structure of the deck.

In some embodiments of the present invention, a plurality of decks of cards having the above-described group configuration of cards will be utilized, i.e. frequently a total of one to four decks is used. In addition, the card game of the present invention may be played by a varying number of players with the minimum number being two players, a dealer and one other player. The number of players who may play the game are only limited by the number of cards used and the practical limitations imposed upon a large group of players.

The card game of the present invention is played with a dealer dealing each player and the dealer a hand of two or three cards as determined by the game method. Each player attempts to obtain a higher ranking or scoring hand than the dealer. Each hand is ranked according to a predetermined priority sequence. At various stages in the game, the players bid according to how they perceive their chances for obtaining a higher ranking hand than the dealer. In one embodiment, the players are granted points if they have a higher priority hand than the dealer, the exact amount of points being determined according to the amount bid. If the dealer has a better hand, points may be correspondingly subtracted from each of the players' scores, added to the dealer's score, etc. A game may continue for a period of time, until a player has achieved a predetermined number of points, for a predetermined number of hands or rounds, etc.

In yet another embodiment of the invention, playing chips or pieces may be bid by the players. If a player has a better hand than the dealer, the player will receive a quantity of playing pieces from the dealer, the exact number of playing pieces received varying depending on the nature of the bid. If a player does not have a winning hand, the dealer receives the player's playing pieces which were bid. If the dealer and a player have hands of equal ranking or scoring, a draw or "push" occurs wherein neither the dealer nor the player receives any playing pieces. At any point in the game, players may quit playing and new players may be added. The dealer may change after every hand, after a predetermined number of hands, after all the cards being used have been dealt, etc. In addition, it is possible for the same person to remain as the dealer for all the hands.

The priority scheme utilized for ranking or prioritizing the players' hands is as follows:

| (1) Automatic Winner | Two CHA-DU-KE cards |
|---|---|
| (2) Second High | Any three cards of a kind, i.e. all three cards from one of the groups 26, 27, 28, 29, 30 |
| (3) Third High | Any straight, i.e. a hand having one card from each of three consecutive groups in the ordering sequence 26, 27, 28; 27, 28, 29; or 28, 29, 30 |

Any three of a kind is prioritized or ranked the same as any other three of a kind so as to result in a draw or a "push". Any straight is ranked the same as any other straight. In addition, the "CHA-DU-KE" cards of group 20 function as wild cards; that is, they may be used as any card of a group in determining three-of-a-kind or a straight.

For example, wherein "10" represents a card of group 26, "J" represents a card of group 27, "Q" represents a card of group 28, "K" represents a card of group 29, "A" represents a card of group 30:

(a) a player's hand having the cards J, Q, and CHA-DU-KE represents a straight;
(b) a player's hand having the cards K, K, and CHA-DU-KE represents three-of-a-kind;
(c) a player's hand having the cards 10, J, Q is ranked equal to a hand with the cards K, A, CHA-DU-KE so as to result in a draw or push;
(d) a player's hand having the cards 10, 10, 10 is ranked equal to a hand with the cards A, A, A so as to result in a draw or push.

More particularly, a card game embodying the features of the present invention is typically started by the players cutting the pack of cards being used, which as previously mentioned, may include more than one deck of fifty-two cards. The player with the highest numbered card then deals first. As will be noted, other methods of determining the dealer can be utilized. In addition, one person may always be the dealer.

Prior to dealing, the players will each place a bid. The dealer then shuffles the pack and deals two cards to each player, one at a time, starting at the dealer's left. The two cards dealt to the players other than to the dealer are dealt face up. However, the first card to the dealer is dealt face down with the second card being dealt face up.

The dealer then places the pack of cards face downwards on the table and checks his down card to determine if he has two CHA-DU-KE cards. If the dealer, in fact, has two CHA-DU-KE cards, the dealer is an automatic winner and each of the other players will lose unless a player also has two CHA-DU-KE cards. If a player has the same hand as the dealer, the hand between the two is referred to as a draw or "push". Between that player and the dealer there is no winner. However, for each player who does not have two CHA-DU-KE cards, the dealer is an automatic winner and, in one embodiment of the present invention, receives the playing pieces bid by each losing player. In yet another embodiment, the losing players may have subtracted from their point total the number of points equal to the amount bid.

Conversely, should a player receive two CHA-DU-KE cards and the dealer does not, the player is an automatic winner and will receive a score double the amount of his bid or receive twice the number of playing pieces bid.

The card hand is over and a third card is not dealt if the dealer receives two CHA-DU-KE cards. In the situation where the dealer did not have two CHA-DU-KE cards, a third card is dealt to those players who were not automatic winners only if they have an opportunity or potential for receiving three-of-a-kind or a straight. If a player's hand does not have such a qualifying potential, a third card is not dealt to that player. Illustrated below are three examples of where a third card might not be dealt:

| (a) | Dealer | Player |
|---|---|---|
| | A | Q |
| | J | J |
| | (no third card) | 10 |

In this example, the dealer is not dealt a third card as there is no opportunity for a straight, i.e. there are two cards, K and Q between A and J. Furthermore, in this example the player will win the amount of points or playing pieces bid.

| (b) | Dealer | Player |
|---|---|---|
| | K | A |

|     | (b) | Dealer | Player |
| --- | --- | --- | --- |
|     |     | Q | J |
|     |     | J | (no third card) |

In this example, the player is not dealt a third card as the player has the same hand as the dealer in the previous example. The player automatically loses to the dealer.

|     | (c) | Dealer | Player |
| --- | --- | --- | --- |
|     |     | K | A |
|     |     | 10 | J |
|     |     | (no third card) | (no third card) |

In this example, neither the dealer or the player is dealt a third card as each has no opportunity for three-of-a-kind or a straight. The player automatically loses to the dealer since whenever a player does not have a qualifying hand, the player will lose to the dealer even if the dealer does not have a qualifying hand.

The third card is then dealt face up to each of the players eligible to receive a third card. At any time after being dealt two cards a player can double his bid if not an automatic winner or loser.

Once all three cards have been dealt, the individual player' hand are compared with the dealer's hand and it is determined according to the above-discussed scoring rules whether the player has a winning or losing hand. If the player has a winning hand, the player obtains points or playing pieces according to his or her bid. If the player has a losing hand, the player loses points or playing pieces according to the amount bid. If the player has a hand equal to the dealer's hand, the player does not gain additional points or playing pieces, nor does the player lose points or playing pieces as this is a draw or "push" situation. However a player who does not have a qualifying hand, i.e. three-of-a-kind or a straight, will lose to the dealer whether the dealer has a qualifying hand or not.

In one embodiment of the present invention, there is one exception to ranking or scoring all three-of-a-kinds as being equal. Namely, a three-of-a-kind including three cards of the same group is prioritized over three of a kind wherein one of the cards is a CHA-DU-KE card. The first type of three-of-a-kind is referred to as a "natural" and is given priority over the latter.

After being dealt two cards, any player can double his bid. If a winning player, who doubles his bid after receiving two cards, receives a third card giving him a natural three-of-a-kind, the player receives points or playing pieces triple that of his original bid. If after receiving the third card, the player does not have a natural three-of-a-kind but has a winning hand, the player receives points or playing pieces double his original bid. If the player has a losing hand, the player loses the double bid. However, if the player has a hand equal to that of the dealer's, there is a draw or push with respect to the bid (see Hand 5 in the examples below).

Following are various examples of player's hands:

|        | DEALER    | PLAYER 1   | PLAYER 2         | PLAYER 3          | PLAYER 4        |
| ---    | ---       | ---        | ---              | ---               | ---             |
| Hand 1 | 10        | J          | J                | A                 | CHA-DU-KE       |
|        | 10        | Q          | CHA-DU-KE        | J                 | 10              |
|        | A         | K          | K                | Automatic         | J               |
|        |           | Winner     | Winner           | Loser             | Winner          |
| Hand 2 | J         | Q          | 10               | Q                 | J               |
|        | Q         | 10         | 10               | K                 | CHA-DU-KE       |
|        |           |            | Double Bid       |                   | Double Bid      |
|        | K         | K          | J                | A                 | K               |
|        |           | Loser      | Loser            | Push              | Push            |
| Hand 3 | CHA-DU-KE | J          | A                | K                 | 10              |
|        | CHA-DU-KE | 10         | J                | A                 | 10              |
|        |           |            | All players would lose |             |                 |
| Hand 4 | J         | J          | A                | Q                 | 10              |
|        | 10        | 10         | CHA-DU-KE        | Q                 | 10              |
|        |           |            |                  | Double Bid        | Double Bid      |
|        | Q         | K          | CHA-DU-KE        | A                 | 10              |
|        |           | Loser      | Winner           | Loser             | Winner (Triple) |
|        |           |            |                  | (Double)          |                 |
| Hand 5 | CHA-DU-KE | CHA-DU-KE  | CHA-DU-KE        | 10                | A               |
|        | K         | A          | CHA-DU-KE        | J                 | Q               |
|        | Q         | Double Bid | Automatic        |                   |                 |
|        |           | Q          | Winner           | A                 | K               |
|        |           | Push       | (Double)         | Loser             | Push            |
| Hand 6 | A         | A          | A                | 10                | 10              |
|        | K         | CHA-DU-KE  | Q                | J                 | Q               |
|        |           | Double Bid |                  |                   |                 |
|        | Q         | A          | J                | A                 | K               |
|        |           | Winner     | Loser            | Loser             | Loser           |
|        |           | (Double)   |                  |                   |                 |

It is to be understood, however, that even though numerous characteristics and advantages of the invention have been set forth, together with details of the structure and function of the invention, the disclosure is illustrative only, and changes may be made in detail, to the full extent indicated by the broad general meaning of the terms in which the appended claims are expressed.

What is claimed is:

1. A card game apparatus comprising a collection of fifty-two cards, said cards being comprised of six distinct groups of cards, every card of a group bearing upon its face an indicia distinctive of the cards of that group, one of said groups of cards having exactly twelve cards and said other five groups of cards having exactly eight cards each, said eight carded-groups bearing indicia according to a predetermined sequential coding system which establishes a ranking between said eight carded-groups, the cards within a given eight carded-group having the same ranking, said eight carded-groups also including indicia common to all cards of said groups consisting of eight cards, the cards of said twelve carded-group each being identically marked with indicia dissimilar from said eight carded-groups so as to be distinguishable from said eight carded-groups.

2. A card game apparatus in accordance with claim 1, wherein said indicia common to said groups having eight cards includes an image of a red rose.

3. A card game apparatus in accordance with claim 2, wherein said indicia common to said group having twelve cards includes the wording "CHA-DU-KE".

4. A card game apparatus in accordance with claim 3, wherein said indicia common to said group having twelve cards further includes an image of a clenched human hand.

5. A card game apparatus in accordance with claim 1 or 4, wherein said game apparatus includes multiple collections of fifty-two cards.

6. A game apparatus comprising a deck of fifty-two cards, said cards having exactly six distinguishable groups of cards, a first group of cards having exactly twelve cards, second through sixth groups of cards each having exactly eight cards, said cards in said first group being similarly marked and distinguishable from said cards of said second through sixth groups, said cards of said second through sixth groups including dissimilar indicia establishing a ranking between said second through sixth groups of cards.

7. A card game apparatus in accordance with claim 6, wherein said first indicia is the image of a red rose, said second indicia is one of the following alphanumeric representations; A, K, Q, J, 10, said second indicia further being positioned in diagonally opposed corners of said cards.

8. A card game apparatus in accordance with claim 6, wherein said card game apparatus includes a plurality of card decks having fifty-two cards.

9. A method of playing a card game with at least two players and a deck of fifty-two cards or multiples thereof, at least one of said players being designated a dealer for dealing the cards, said deck of cards including six distinguishable groups of cards, a first group having exactly twelve cards and second through sixth groups each having exactly eight cards, said cards of said first group being identical indicia and being distinguishable from cards of said second through sixth groups, and said second through sixth groups bearing first indicia which sequentially ranks said second through sixth groups, said method comprising:

(a) dealing by said dealer to all players two cards, one at a time, (b) dealing by said dealer a third card to each player including said dealer, having a potential scoring hand, not dealing a third card to a player not having a potential scoring hand, however, if said dealer has two cards of said first group then dealing no more cards, if a player other than the dealer has two cards of said first group and said dealer does not, then said dealer dealing to all players including said dealer not having two cards of said first group and having a potential scoring hand, a third card, a potential scoring hand being defined as the possibility of receiving one of the following card combinations by being dealt a third card: two cards from said first group; three cards, all from any one of said second through sixth groups; three cards, one of each from said second, third and fourth groups or said third, fourth and fifth groups or said fourth, fifth and sixth groups;

(c) dealing at most three cards to each player;

(d) scoring each player's cards according to a predetermined priority sequence, wherein said predetermined priority sequence for scoring each player's hand is as follows: two cards from said first group having the highest priority; three cards all from any one of said second through sixth groups having the second highest priority; three cards one of each from said second, third and fourth groups or said third, fourth and fifth groups or said fourth, fifth and sixth groups; and (e) using a card from said first group a substitute for a card from any one of said second through sixth groups when determining a potential scoring hand and when scoring a player's hand.

* * * * *

UNITED STATES PATENT AND TRADEMARK OFFICE
CERTIFICATE OF CORRECTION

PATENT NO. : 4,440,398
DATED : April 3, 1984
INVENTOR(S) : Alfred G. Charon

It is certified that error appears in the above-identified patent and that said Letters Patent is hereby corrected as shown below:

Column 1, line 10, "player's" should be --players--.

Column 2, line 21, "numeral" should be --numerals--.

Column 8, line 40, after "group" insert --as--.

Signed and Sealed this

Twenty-eighth Day of August 1984

[SEAL]

Attest:

GERALD J. MOSSINGHOFF

*Attesting Officer*  *Commissioner of Patents and Trademarks*